C. F. BACON.
BUG ELIMINATING MACHINE.
APPLICATION FILED AUG. 6, 1914.
1,144,019.
Patented June 22, 1915.
2 SHEETS—SHEET 1.
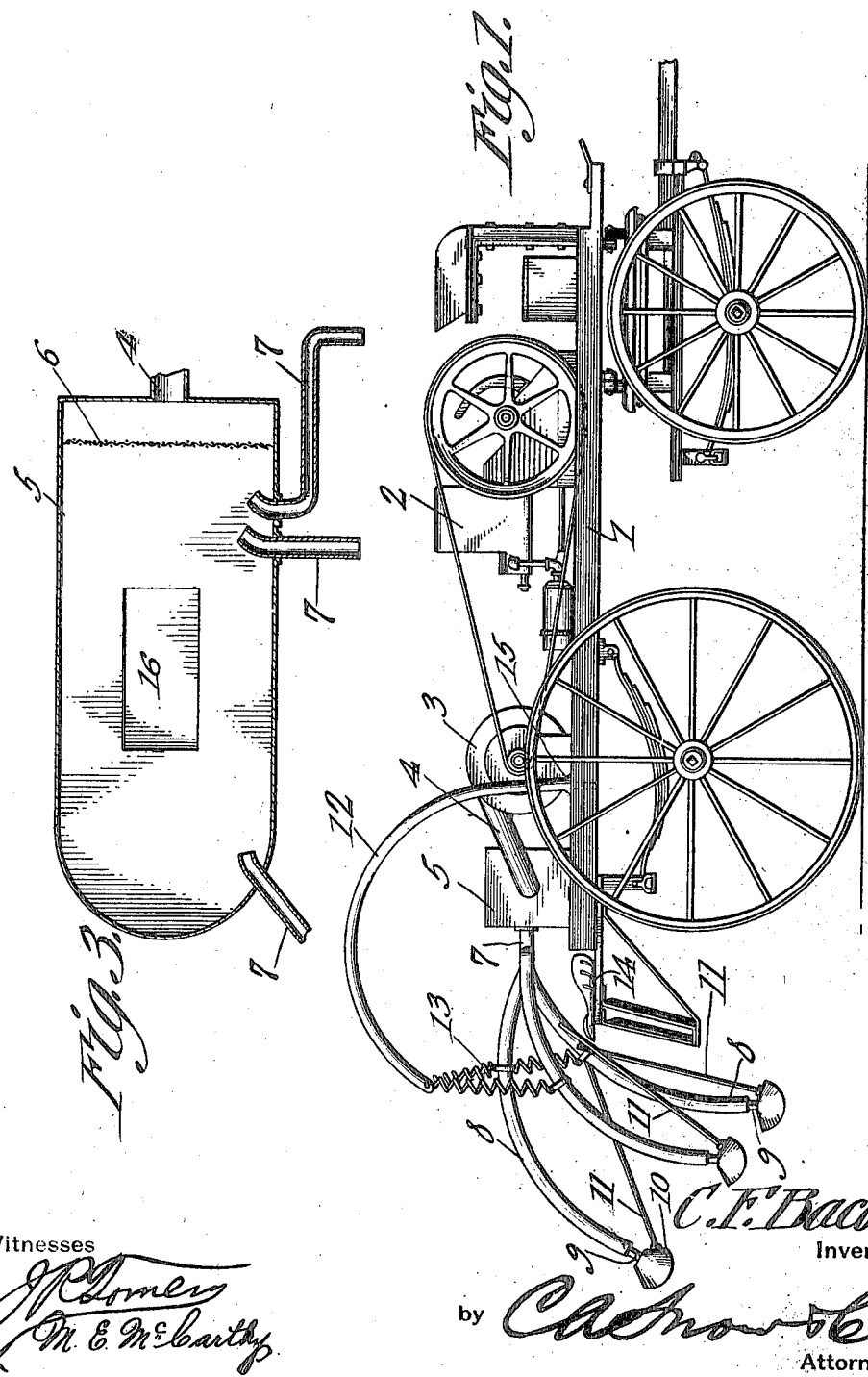
Witnesses
C. F. Bacon
Inventor
by
Attorneys C. F. BACON.
BUG ELIMINATING MACHINE.
APPLICATION FILED AUG. 6, 1914.
1,144,019.
Patented June 22, 1915.
2 SHEETS—SHEET 2.
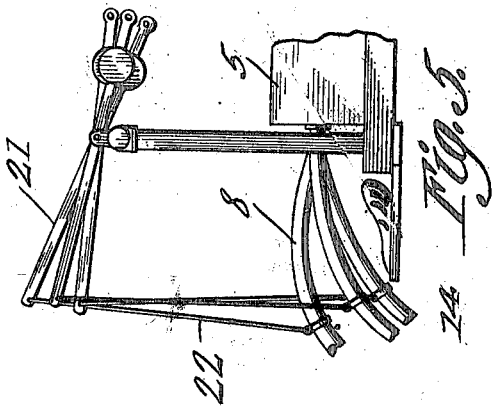
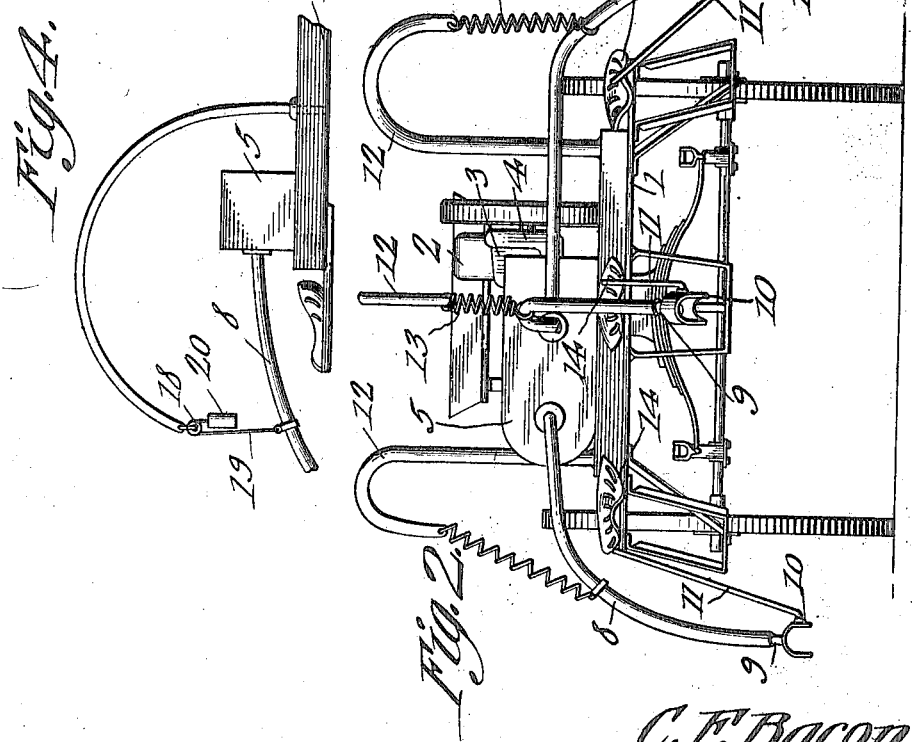
Witnesses
C. F. Bacon
Inventor
by
Attorneys

UNITED STATES PATENT OFFICE.

CHARLES F. BACON, OF TOLEDO, OHIO.

BUG-ELIMINATING MACHINE.

1,144,019.　　　　　Specification of Letters Patent.　　Patented June 22, 1915.

Application filed August 6, 1914. Serial No. 855,486.

*To all whom it may concern:*

Be it known that I, CHARLES F. BACON, a citizen of the United States, residing at Toledo, in the county of Lucas and State of Ohio, have invented a new and useful Bug-Eliminating Machine, of which the following is a specification.

This invention relates to machines for removing insects from vegetation, one of its objects being to provide a simple and compact machine of this character utilizing nozzles which are adapted to be directed over the plants being acted upon, means being employed for creating a suction through the nozzles so that any insects upon the vegetation will be drawn in to the machine.

A further object is to provide means whereby the insects are accumulated within the machine without being discharged therefrom with the exhausting air.

A further object is to provide simple and efficient means for yieldingly supporting the nozzles where they can be easily reached and manipulated.

With the foregoing and other objects in view which will appear as the description proceeds, the invention resides in the combination and arrangement of parts and in the details of construction herinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings: Figure 1 is a side elevation of the machine. Fig. 2 is a rear elevation thereof. Fig. 3 is an enlarged vertical longitudinal section through the collecting tank. Fig. 4 is a side elevation of a slightly modified form of machine. Fig. 5 is a similar view showing another modified form.

Referring to the figures by characters of reference 1 designates a vehicle which may be propelled by any means desired and on this vehicle is arranged a motor 2 adapted to actuate a suction fan located within a casing 3. The inlet of this casing 3 is in communication, through a pipe 4, with a separating tank 5, there being a screen 6 extending across the tank close to the outlet thereof so that insects or the like which may be drawn into the tank will be prevented from entering the pipe 4.

The tank 5 is preferably disposed transversely of the vehicle at the rear end thereof, and discharging into the tank 5 are nozzles 7 the discharge ends of which are preferably directed toward the tank outlet or pipe 4. Flexible tubes 8 are secured upon the outer ends of the nozzles 7 and engaging the outer or free ends of these tubes 8 are nipples 9 extending from suction hoods 10. Rods 11 are secured to the hoods 10 and extend toward the rear end of the vehicle 1 where they can be readily grasped by one or more persons seated upon the rear portion of the vehicle.

Swiveled upon the vehicle 1 adjacent the rear end thereof are curved arms 12 and depending from these arms are supporting springs 13 attached to the tubes 8. Thus the tubes are yieldingly supported but, by manipulating the rods or handles 11, the hoods 10 at the free ends of the tubes can be raised and lowered and can be swung laterally so as to bring the said hoods close to any selected plant or plants.

The seats to be occupied by the persons manipulating the hoods 10, have been indicated at 14. It will be obvious that when the hoods are swung laterally the arms 12 are likewise free to swing laterally about their swivel connections 15 with the vehicle 1.

In using the machine, the same is drawn forward between rows of plants and when motor 2 is set in operation the fan in casing 3 will create a suction through the hoods 10, tubes 8, nozzles 7 and tank 5. Thus when one of the hoods is brought close to a plant the suction established through the hood will be sufficient to draw thereinto any insects which may be on the plant. These insects will be carried into the tank 5 and against the screen 6, the air passing on through the pipe 4 and being exhausted from the casing 3 while the insects are retained within the tank 5. The tank 5 may be provided with a closure 16 at any suitable point which, when opened, allows the accumulated insects to be readily removed. Instead of providing the tubes 8 with swiveled arms 12 connected to the tubes through links 17, a structure such as shown in Fig. 4 can be provided. This structure includes a swiveled supporting arm 17′ having a pulley 18 on which is mounted a cord, chain or other flexible element 19, one end of which is secured to the tube 8 while the other end carries a counterbalance 20. Thus the tube 8 is free to be moved upwardly and downwardly and will be held in any position to which it may be moved.

Another modified structure has been illustrated in Fig. 5 wherein counterbalance levers 21 are employed, each lever being connected by a rod, cord, or other suitable element 22 to one of the tubes 8. These levers are free to swing laterally as well as upwardly and downwardly and will operate in the same manner as the structures shown in Figs. 1 and 4 to facilitate the manipulation of the tubes 8 and the hoods connected thereto.

What is claimed is:—

1. A machine for collecting insects, including a vehicle, a collecting tank, means for sucking air through the tank, a screen within the tank for separating insects from the air issuing from the tank, a hood, a flexible tube connecting the hood to the tank, a swiveled arm upon the vehicle, and a yielding connection between the arm and the tube.

2. A machine for collecting insects, including a vehicle, a collecting tank, means for sucking air through the tank, a hood, a flexible tube connecting the hood to the tank, means within the tank for retaining insects, a handle extending from the hood for actuation by an occupant of the vehicle, an arm swiveled upon the vehicle, and a spring connection between the arm and the tube.

In testimony that I claim the foregoing as my own, I have hereto affixed my signature in the presence of two witnesses.

CHARLES F. BACON.

Witnesses:
C. C. WHITMORE,
G. G. HENNESSY.